United States Patent [19]

Nakajima

[11] Patent Number: 5,096,220
[45] Date of Patent: Mar. 17, 1992

[54] COVER FOR AIR BAG SYSTEM
[75] Inventor: Hideo Nakajima, Hikone, Japan
[73] Assignee: Takata Corporation, Tokyo, Japan
[21] Appl. No.: 616,065
[22] Filed: Nov. 20, 1990
[30] Foreign Application Priority Data
 Dec. 14, 1989 [JP] Japan .................. 1-324414
[51] Int. Cl.$^5$ .............................................. B60R 21/16
[52] U.S. Cl. ................................. 280/728; 280/743
[58] Field of Search .......... 280/743, 737, 741, 728; 264/154, 345, 234, 293

[56] References Cited
U.S. PATENT DOCUMENTS
4,465,729 8/1984 Cancio et al. .................. 264/293
4,852,907 8/1989 Shiraki et al. .................. 280/731
4,903,986 1/1990 Cok et al. .................. 280/743

FOREIGN PATENT DOCUMENTS
2542764 4/1977 Fed. Rep. of Germany ...... 280/739
51-102142 2/1950 Japan .

Primary Examiner—Charles A. Marmor
Assistant Examiner—Paul Dickson
Attorney, Agent, or Firm—Kanesaka and Takeuchi

[57] ABSTRACT

A cover for an air bag system for covering a folded air bag, comprising; network members for reinforcing the cover, and a tear line for starting a cleavage formed on the cover. The network members are provided on the portion other than the tear line, wherein joint pieces for connecting the network members with each other across the tear line are formed.

5 Claims, 5 Drawing Sheets

COVER FOR AIR BAG SYSTEM

FIELD OF THE INVENTION AND RELATED ART STATEMENT

The present invention relates to a cover for an air bag system for protecting occupant when a car collision or so occurs. In particular, the present invention relates to the cover which is reinforced by burying a network member.

The air bag system is, as well known, open an air bag immediately at the time of an urgent matter such like collision of car. At ordinary time, the air bag is folded and covered by a cover. The air bag is supported by a mounting plate, for example, called a retainer, and the cover is also fixed on the mounting plate by a revet, machine screw, bolt and so on.

The cover is provided with a starting line (tear line) for making cleavage when the air bag opens. The tear line is a fragile portion in which the strength is lower than the surrounding portion thereof, and is formed in a predetermined linear shape. When the air bag opens, the cover cleaves along the tear line.

When the cover cleaves, a remarkably large amount of tension is applied on the cover. Therefore by burying the network member into the cover, the required tension strength is supplied to the portion other than the tear line of the cover.

If the network member is provided in the tear line portion, it is not possible to form the tear line as the fragile portion. Therefore, when manufacturing of the cover, as shown in FIGS. 10 and 11, a plurality of network members, 21, 22, 23 and 24 is provided in a metal mold 20 to form gaps between the network members and a synthetic resin is inserted to form the linear fragile gaps in which the network member does not exist.

As mentioned above, in order to position the plurality of network members at the fixed position of the metal mold 20, may pins 25 in the form of projection are formed on the metal mold 20 and the network members are fixed by hooking them on the pins 25 and pins 26 for forming joint holes. Therefore, it requires time for fixing the network members on the metal mold, thereby causing difficulty to shorten a formation cycle.

Japan Laid-open Utility Model Application No. 102142/76 shows a cover for an air bag system in which a large number of holes and long holes is provided on a thin iron plate to form a tear line portion. However, since the iron plate itself has a fixed shape, it does not suggest an idea for overcoming the difficulty at the time of setting the metal mold, which forms the feature of the present invention.

OBJECT AND SUMMARY OF THE INVENTION

The object of the present invention is to provide an improved cover for an air bag system, wherein one piece of network members is used at the time of setting the network members to be inserted into the metal mold, and the network members are positioned at the fixed position in the metal mold with only one step of hooking the network members on the pin of the metal mold for applying the appropriate tension. Whereby, it is possible to save time for molding remarkably. Further, it is needless to form many pins on the metal mold for hooking the network member.

According to the cover of the air bag system of the present invention, the cover is to cover the folded air bag, the network members for reinforcing the cover are buried in the cover and, the tear line for starting cleavage is provided on the cover. The network members are provided on the portions other than the tear line, and joint pieces are formed for connecting the network members across the tear line.

In the cover for the air bag system of the present invention, since the network members are connected to each other by means of the joint pieces, the network members form one piece as a whole of the cover. Accordingly, it is possible to easily position the network members in case of setting them to the metal mold. Further, it is needless to form many pins for fixing the network members on the metal mold.

DESCRIPTION OF THE PREFERRED EMBODIMENTS

Figure 1:
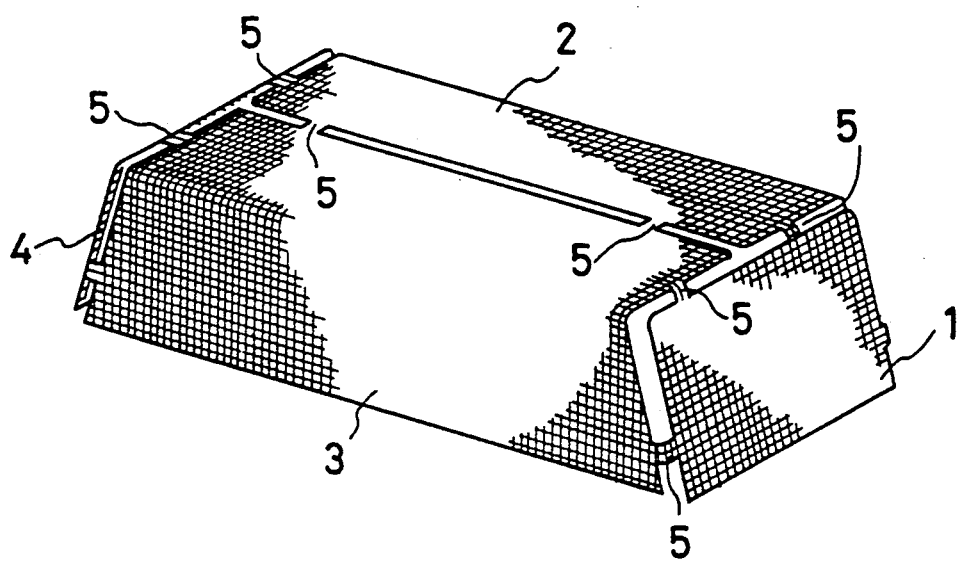
FIG. 1 is a perspective view of the network members which are used for the cover of one embodiment of the present invention.

FIG. 1 is a prespective view of the network members which are used for the cover of the air bag system according to one embodiment of the present invention, wherein four pieces of network members 1, 2, 3 and 4 are connected by means of joint piece 5 to form one piece or unit as a whole.

Figure 2:
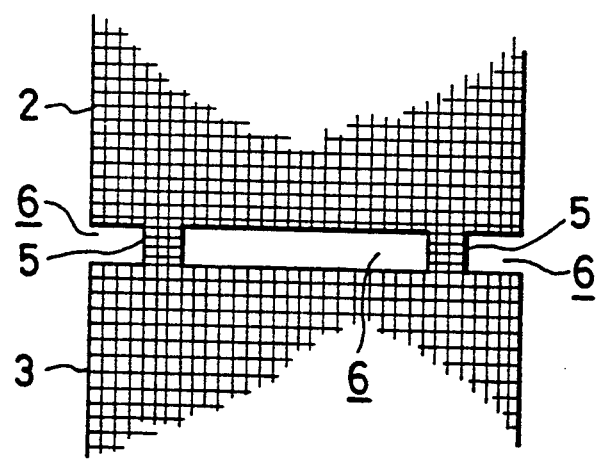
FIGS. 2, 3A and 3B are plan views of the network members.

In the case where the network members are formed of a synthetic fiber, the joint pieces 5 are formed as following. Namely, as shown in FIG. 2, one piece of a network member is cut to form a long hole 6 for forming a tear line by a fusion and so on, thereby forming network members 1 to 4 in the form of blocks. In this case, the joint pieces 5 are formed as remaining portions after the network member is cut. Then, the joint pieces 5 are heated such that fusion does not occur to make it vitrify and the joint pieces 5 are made to have a low strength.

Figure 3A:
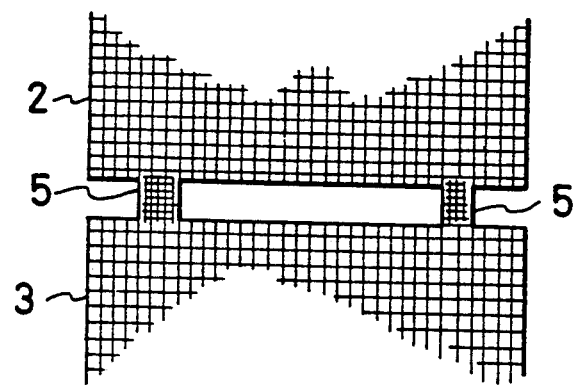

The another method for forming the joint pieces 5 is shown in FIG. 3A. In FIG. 34, as the fiber for forming the portion in which the joint pieces 5 is expected to be formed, fiber having lower strength than that in the other portion is used. According to the above-mentioned method, the joint pieces 5 having low strength can be formed.

Figure 3B:
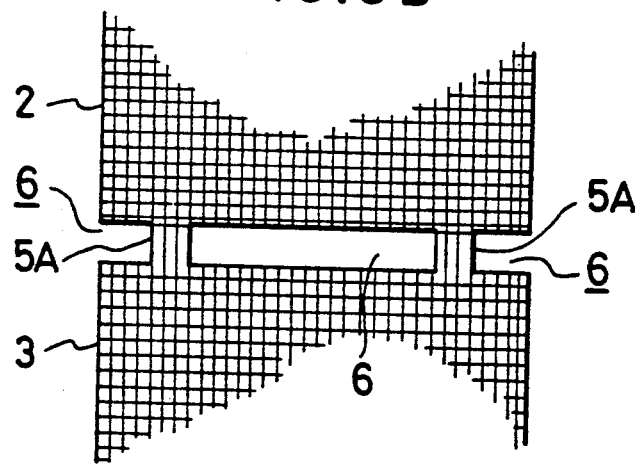

As the still another method for forming the joint piece, as shown in FIG. 3B, each network member 1 to 4 may be connected by a weak thread 5A.

Figure 4:
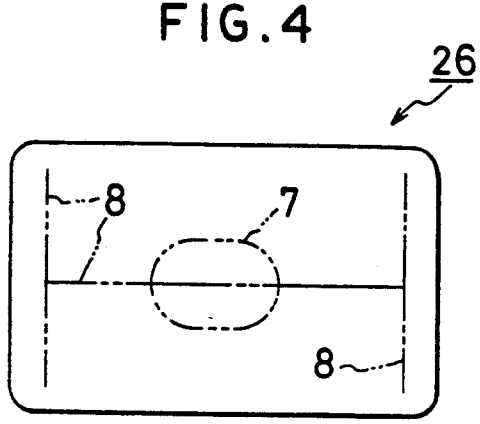
FIG. 4 is a plan view of the cover.

The joint piece 5 is preferably provided on a non-central (other than a center portion 7) of the cover 26, as shown in FIG. 4. Namely, since the center portion 7 of the cover 26 is a portion for starting a cleavage 9 when the air bag opens as shown in FIG. 5, the joint piece 5 should not exist in the center portion 7 to start the cleavage immediately.

Figure 5:
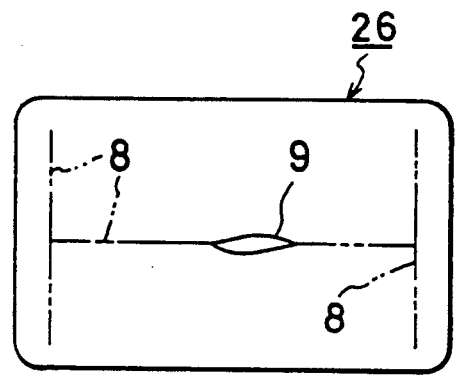
FIG. 5 is a view for showing cleavage of the cover.
Figure 6:
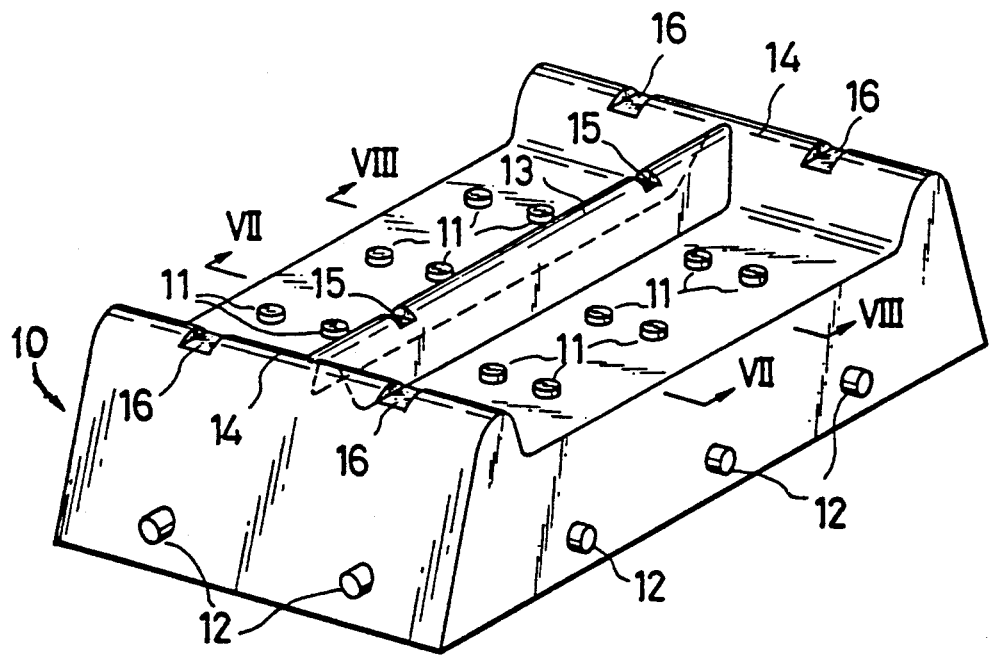
FIG. 6 is a perspective view of the metal mold.
Figure 7:
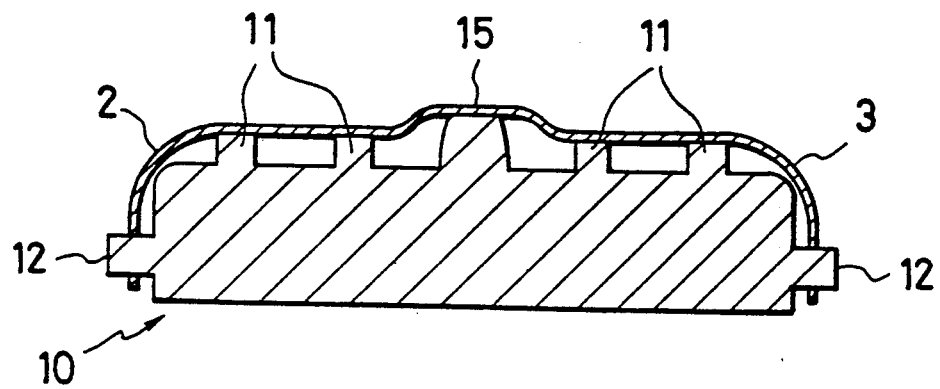
FIGS. 7 and 8 are sectional views of the metal mold.
Figure 8:
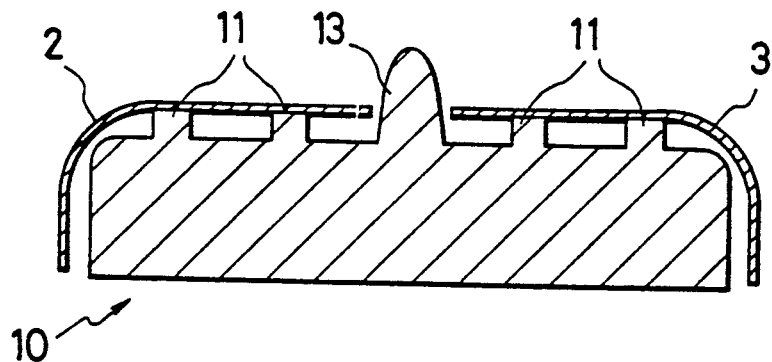

Once the cleavage 9 starts, as shown in FIG. 5, the cleavage goes on as if the cover is teared off along the tear line 8. Thus, although the joint piece 5 exists in the tear line 8, the joint pieces breaks easily and does not for any dificulty for the cleavage at all. FIG. 6 is a perspective view of a metal mold 10 on which the network member as shown in FIG. 1 is set. FIGS. 7 and 8 are sectional views for showing the metal mold with the network member provided. (Such sectional views show the cross sections in accordance with the VII—VII line and VIII—VIII line, respectively.)

Figure 9:
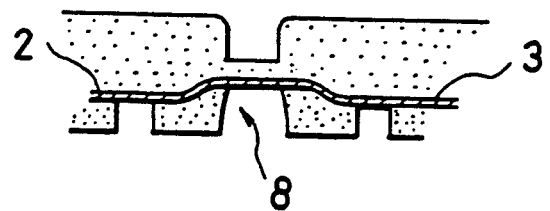
FIG. 9 is a sectional view of the subject portion of the cover.
Figure 10:
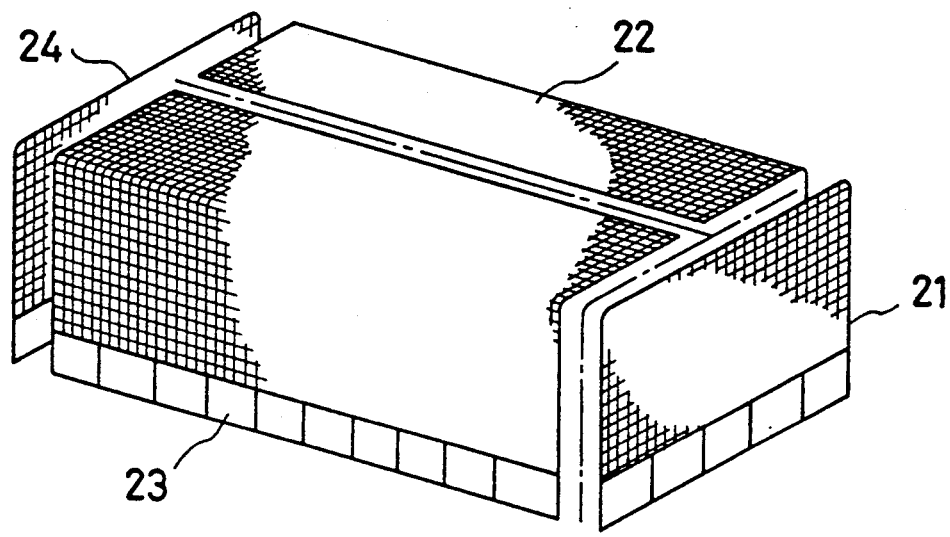
FIG. 10 is a perspective view for showing the conventional art.
Figure 11:
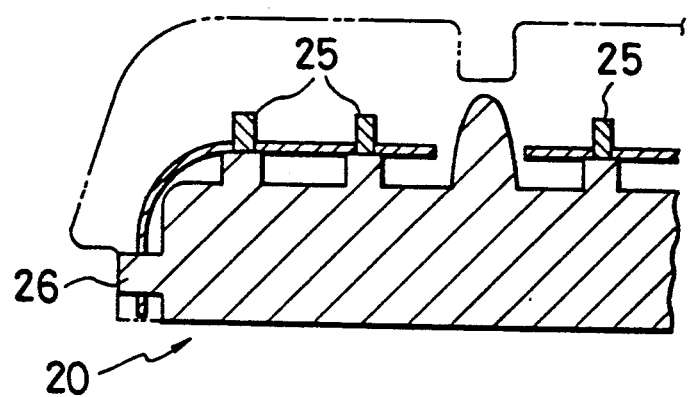
FIG. 11 is a sectional view for showing the conventional metal mold.

As shown in the drawings, some button type projections 11 are formed on the metal mold 10 in order to make the network member float from the metal mold surface, and the network member is simply put on such projections 11. On the side surface of the metal mold, some pins 12 for forming through holes (hole for attaching the cover on the retainer) such like rivet, bolt, and machine screw are formed, and the network is hooked on the pins 12 only. Projected portions 13 and 14 are formed on the metal mold 10 to form a thin portions along the tear line, and cut-out portions 15 and 16 for passing the joint pieces 5 are formed on the projected portions 13 and 14. FIG. 9 is a sectional view relative to the tear line 8 of the manufactured cover. As shown in FIG. 9, the thickness of the synthetic resin layer in the portion of the tear line 8 is thin. The above-mentioned projected portions 13 and 14 work to form this thin portion of the synthetic resin layer.

What is claimed is:

1. A cover for an air bag system for covering a folded air bag, comprising:
    a synthetic resin body for forming a substantial portion of the cover and having a tear line, said synthetic resin body, when the folded air bag is opened, cleaving along the tear line,
    a network member embedded in the synthetic resin body for covering the substantial portion of the cover to reinforce the synthetic resin body, said network member having elongated cuts and being separable along the tear line, and the elongated cuts and
    integral joint pieces in the network member separated by the elongated cuts in the network member for connecting portions of the network member together across the tear line, said joint pieces being located outside a center area of the tear line and being made fragile so that when the air bag is opened, the synthetic resin body is easily opened along the tear line without being prevented by the joint pieces while the synthetic resin body is strengthened by the network member.

2. A cover for an air bag system according to claim 1, wherein said tear line is located in a middle of the synthetic resin body to cross the same, two portions of the network member extending from first side portions of the body to the middle thereof to align along the tear line and being separable across the tear line by the joint pieces located outside the center area so that the network member can be easily handled when formed with synthetic resin.

3. A cover for an air bag system according to claim 2, wherein two portions of the network member are further provided at second side portions of the cover, said network member at the second side portions being separable with the tear line by the joint pieces.

4. A cover for an air bag system according to claim 1, wherein said network member is made of synthetic fibers, said joint pieces being formed by cutting the synthetic fibers and then heating the joint pieces for vitrification so that the joint pieces become fragile.

5. A cover for an air bag system according to claim 1, wherein said network member is made of fibers, said joint pieces being formed of fibers having lower strength than that of the network member.

* * * * *